United States Patent
Tang et al.

(10) Patent No.: US 12,528,884 B2
(45) Date of Patent: Jan. 20, 2026

(54) MODIFIED CELLULOSE AND THE PREPARATION METHOD AND APPLICATION THEREOF

(71) Applicant: ZHEJIANG SCI-TECH UNIVERSITY, Zhejiang (CN)

(72) Inventors: Yanjun Tang, Hangzhou (CN); Xinhua Dong, Hangzhou (CN); Feng Xu, Hangzhou (CN); Xueming Zhang, Hangzhou (CN); Tianying Chen, Hangzhou (CN); Feiyun Li, Hangzhou (CN); Xiaoyu Wang, Hangzhou (CN)

(73) Assignee: ZHEJIANG SCI-TECH UNIVERSITY, Hangzhou (CN)

( * ) Notice: Subject to any disclaimer, the term of this patent is extended or adjusted under 35 U.S.C. 154(b) by 0 days.

(21) Appl. No.: 19/183,918

(22) Filed: Apr. 20, 2025

(65) Prior Publication Data
US 2025/0257151 A1    Aug. 14, 2025

Related U.S. Application Data

(63) Continuation of application No. PCT/CN2024/098127, filed on Jun. 7, 2024.

(30) Foreign Application Priority Data

Mar. 7, 2024 (CN) .......................... 202410259740.0

(51) Int. Cl.
*C08B 5/00* (2006.01)
*C08J 5/18* (2006.01)

(52) U.S. Cl.
CPC .................. *C08B 5/00* (2013.01); *C08J 5/18* (2013.01); *C08J 2301/02* (2013.01)

(58) Field of Classification Search
CPC ....................................................... C08B 5/00
See application file for complete search history.

(56) References Cited

FOREIGN PATENT DOCUMENTS

| CN | 103113624 | * | 5/2013 | ................ C08L 1/12 |
| CN | 112521662 A | | 3/2021 | |

(Continued)

OTHER PUBLICATIONS

Vo et al., "Ionic-Liquid-Derived, Water-Soluble Ionic Cellulose" Chem. Eur. J. vol. 18 pp. 9019-9023, DOI: 10.1002/chem. 201200982 (Year: 2012).*

(Continued)

*Primary Examiner* — Eric Olson
(74) *Attorney, Agent, or Firm* — PORUS IP LLC

(57) ABSTRACT

Provided is a modified cellulose, a preparation method and application thereof. The modified cellulose includes a flame retardant cellulose ester film, and the preparation method includes: obtaining a homogeneous cellulose solution by adding a cellulose to an ionic liquid cosolvent system; obtaining a cellulose phosphite ester solution by adding dimethyl phosphite and a catalyst to the homogeneous cellulose solution for performing a transesterification; obtaining cellulose phosphite ester powder by regeneration solvent precipitation, washing, centrifugation, and drying of the cellulose phosphite ester solution; and obtaining the flame retardant cellulose ester film by evaporating solvent after dissolving the cellulose phosphite ester powder in dimethyl sulfoxide.

8 Claims, 5 Drawing Sheets

(56) References Cited

FOREIGN PATENT DOCUMENTS

| CN | 114667312 A | 6/2022 |
|----|-------------|--------|
| CN | 115403585 A | 11/2022 |
| CN | 117447770 A | 1/2024 |
| CN | 118027474 A | 5/2024 |
| JP | 2023176569 A | 12/2023 |

OTHER PUBLICATIONS

Al Hokayem et al., "Flame Retardant-Functionalized Cotton Cellulose Using Phosphonate-Based Ionic Liquids" Molecules vol. 25 p. 1629, doi:10.3390/molecules25071629 (Year: 2020).*

English machine translation of CN103113624, downloaded form patents.google.com (Year: 2013).*

International Search Report in PCT/CN2024/098127 mailed on Nov. 14, 2024, 11 pages.

Written Opinion in PCT/CN2024/098127 mailed on Nov. 14, 2024, 11 pages.

Dong, Xinhua et al., Preparation and characterization of cellulose phosphite ester with high flame retardancy via transesterification in BmimCI/DMSO system, Industrial Crops & Products, 2024, 13 pages.

\* cited by examiner

MODIFIED CELLULOSE AND THE PREPARATION METHOD AND APPLICATION THEREOF

CROSS-REFERENCE TO RELATED APPLICATIONS

This application is a Continuation of International Application No. PCT/CN2024/098127, filed on Jun. 7, 2024, which claims priority to Chinese Patent Application No. 202410259740.0, filed on Mar. 7, 2024, the entire contents of each of which are hereby incorporated by reference.

TECHNICAL FIELD

The present disclosure relates to the technical field of manufacturing flame retardant films, and in particular, to a modified cellulose and the preparation method and application thereof.

BACKGROUND

With the awareness of environmental protection growing, cellulose has become a popular choice for the manufacture of a wide range of materials due to its renewable, biodegradable, and biocompatible properties. Due to the demand for environmentally friendly products, cellulose-based products have great potential for application in a variety of fields such as packaging, biomedical composites, electrodes, capacitors, adsorption and separation. However, a residual carbon rate of untreated microcrystalline cellulose is only 0.37%. The untreated microcrystalline cellulose is highly flammable, and is therefore highly limited in applications with flame retardant requirements.

In fact, the modification of cellulose is widely considered to be a key method for achieving functionalized applications of the cellulose. Usually, dehydrated glucose units on the molecular chain of the cellulose or surface groups (—OH, —CHO, —COOH, etc.) of the cellulose may be involved in the chemical reaction, thereby realizing the functionalized modification and the modification of the molecular structure of the cellulose. Correspondingly, esterification, acylation, silylation, and polymer grafting are also important ways to achieve functionalized modification of the cellulose. The modification of the molecular structure improves the flame retardancy of cellulose-based products, thereby promoting the functionalization and high-value utilization of the cellulose.

Methods for the modification of the molecular structure to improve the flame retardancy of the cellulose mainly include phosphorylation, silylation, cross-linking, and covalent functionalization. In addition, when designing the molecular structure of the cellulose, swelling or dissolving the cellulose to expose more hydrogen bonds is important for improving the flame retardancy of the cellulose.

Therefore, there is a need to provide a modified cellulose and a preparation method thereof, which provides a new solution for preparing cellulose films with good flame retardant effect.

SUMMARY

One or more embodiments of the present disclosure provide a preparation method for a modified cellulose, the modified cellulose including a flame retardant cellulose ester film. The preparation method includes:

(a) obtaining a homogeneous cellulose solution by adding cellulose to an ionic liquid cosolvent system;
(b) obtaining a cellulose phosphite ester solution by adding dimethyl phosphite and a catalyst to the homogeneous cellulose solution obtained in step (a) for performing a transesterification;
(c) obtaining cellulose phosphite ester powder by regeneration solvent precipitation, washing, centrifugation, and drying of the cellulose phosphite ester solution obtained in step (b); and
(d) obtaining the flame retardant cellulose ester film by evaporating solvent after dissolving the cellulose phosphite ester powder obtained in step (c) in dimethyl sulfoxide.

In some embodiments, in the step (a), the ionic liquid cosolvent system is a mixture of 1-butyl-3-methylimidazole chloride salt and dimethyl sulfoxide in a mass ratio of 2:1.

In some embodiments, in the step (a), a mass ratio of the cellulose to the ionic liquid cosolvent system is 1:30, the cellulose is a microcrystalline cellulose powder with a degree of polymerization of 280, a dissolution temperature of the cellulose in the ionic liquid cosolvent system is 110° C., and a dissolution time of the cellulose in the ionic liquid cosolvent system is 1 h.

In some embodiments, in the step (b), the molar ratio of dehydrated glucose units of the homogeneous cellulose solution to dimethyl phosphite is 1:(7-9), and a reaction temperature of the transesterification is 110° C. and the reaction time of the transesterification is 3 h.

In some embodiments, in the step (b), the catalyst is 1,8-diazabicyclo[5.4.0]undec-7-ene, and a molar ratio of the 1,8-diazabicyclo[5.4.0]undec-7-ene to dimethyl phosphite is 1:4.

In some embodiments, the step (c) includes: obtaining a precipitate of cellulose phosphite ester by adding ethanol to the cellulose phosphite ester solution, wherein a mass ratio of the ethanol to the ionic liquid cosolvent system is 2:1; and obtaining the cellulose phosphite ester powder by drying the precipitate of the cellulose phosphite ester after washing and centrifuging for 5 times.

In some embodiments, the step (d) includes: obtaining a cellulose phosphite ester-dimethyl sulfoxide solution by weighing the cellulose phosphite ester powder and adding the cellulose phosphite ester powder to the dimethyl sulfoxide for dissolving, wherein a mass ratio of the cellulose phosphite ester powder to the dimethyl sulfoxide is 3:100; and obtaining the flame retardant cellulose ester film by drying the cellulose phosphite ester-dimethyl sulfoxide solution in a vacuum drying oven at 80° C. for 48 h.

In some embodiments, a residual carbon rate of the flame retardant cellulose ester film is within a range of 30.4-33.7%.

BRIEF DESCRIPTION OF THE DRAWINGS

The present disclosure will be further illustrated by way of exemplary embodiments, which will be described in detail by means of drawings. These embodiments are not limited, and in these embodiments, the same numbering denotes the same structure, wherein.

DETAILED DESCRIPTION

Figure 1:
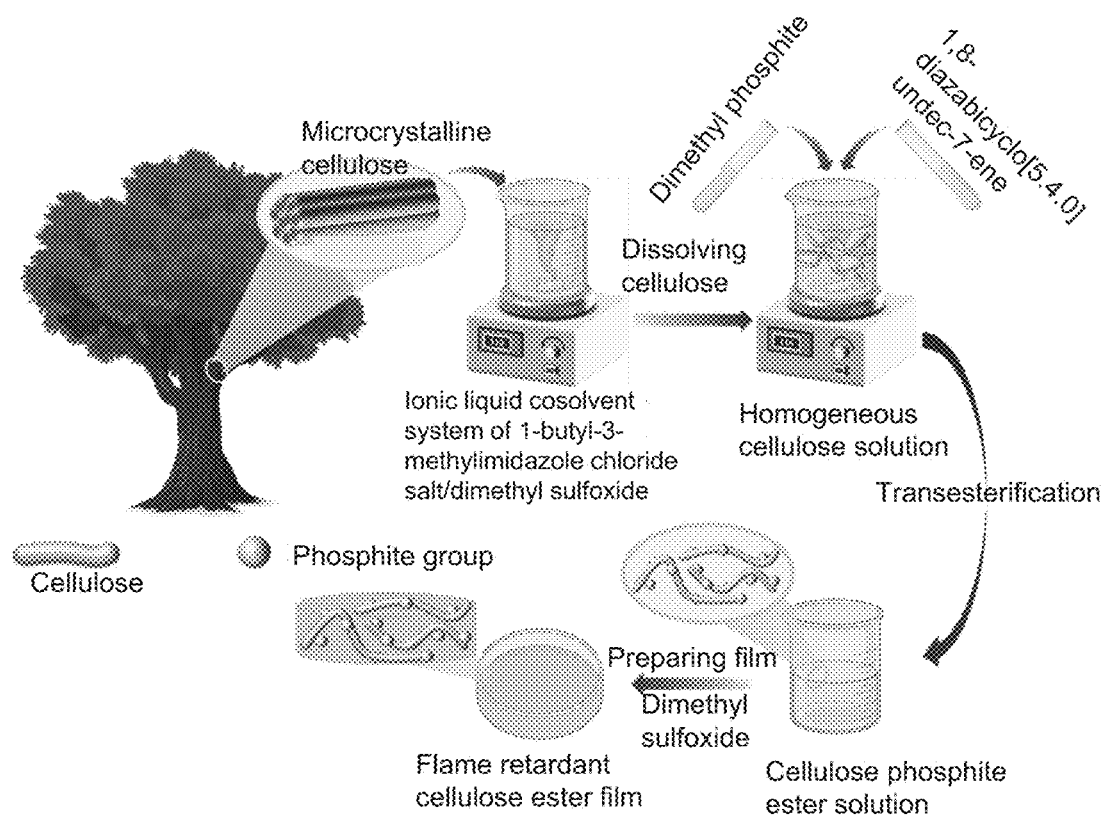
FIG. 1 is a schematic diagram illustrating a preparation method for a flame retardant cellulose ester film according to some embodiments of the present disclosure.

In order to more clearly illustrate technical solutions of embodiments of the present disclosure, the drawings required to be used in the description of the embodiments are briefly described below. Obviously, the drawings in the following description are only some examples or embodiments of the present disclosure, and it is possible for those skilled in the art to apply the present disclosure to other similar scenarios according to these drawings without creative labor. Unless obviously obtained from the context or the context illustrates otherwise, the same numeral in the drawings refers to the same structure or operation.

As shown in the present disclosure and the claims, unless the context clearly suggests an exception, the words "one," "a", "an", and/or "the" do not refer specifically to the singular, but may also include the plural. Generally, the terms "including" and "comprising" suggest only the inclusion of clearly identified steps and elements that do not constitute an exclusive list, and the method or device may also include other steps or elements.

Cellulose has advantages of renewable and biodegradable, which has been widely used in a variety of fields such as packaging, biomedical materials, electrodes, etc. The inherent flammability of the cellulose poses a potential fire hazard that may lead to a threat to social safety. Modification of the molecular structure is an effective way to improve the flame retardancy of the cellulose.

In a way, homogeneous chemical modification is an effective technique for converting the cellulose into a highly homogenized derivative. The modification process alters the physical and chemical properties of the cellulose, thereby facilitating the utilization of the cellulose. Homogeneous dissolution of the cellulose is a critical step before the modification of the molecular structure. Homogeneous systems for the modification of the cellulose include dimethyl sulfoxide/tetrabutylammonium fluoride, lithium chloride/N,N-dimethylacetamide, and an ionic liquid. The ionic liquid has excellent properties such as non-volatility and non-oxidization, which is an environmentally friendly solvent most likely to be used in the preparation of cellulose derivatives with specific structures. Flame retardancy of the cellulose may be achieved by the flame retardancy inherent in a phosphite group. After the cellulose is dissolved in a homogeneous system, a hydroxyl group of the cellulose is replaced by a phosphite group through a transesterification, thereby improving the flame retardancy of the cellulose.

Embodiments of the present disclosure provide a preparation method for a modified cellulose, the modified cellulose including a flame retardant cellulose ester film. The preparation method includes the following steps.

(a) A homogeneous cellulose solution is obtained by adding cellulose to an ionic liquid cosolvent system.

In some embodiments, the ionic liquid cosolvent system is a mixture of 1-butyl-3-methylimidazole chloride salt and dimethyl sulfoxide in a mass ratio of 2:1.

In some embodiments, a dissolution speed of the cellulose may be increased by adding the dimethyl sulfoxide, which also helps to reduce a viscosity of the ionic liquid cosolvent system.

In some embodiments, a mass ratio of the cellulose to the ionic liquid cosolvent system is 1:30, the cellulose is a microcrystalline cellulose powder with a degree of polymerization of 280, a dissolution temperature of the cellulose in the ionic liquid cosolvent system is 110° C., and a dissolution time of the cellulose in the ionic liquid cosolvent system is 1 h.

In some embodiments, if too much cellulose is added, the cellulose is not sufficiently dissolved, resulting in an increase in a viscosity of the ionic liquid cosolvent system. In embodiments of the present disclosure, by controlling the mass ratio of the cellulose to the ionic liquid cosolvent system, the cellulose can be sufficiently dissolved to obtain the homogeneous cellulose solution.

In some embodiments of the present disclosure, the homogeneous cellulose solution is obtained by dissolving the cellulose in the ionic liquid cosolvent system, and lots of exposed hydroxyl groups in the cellulose increase reaction sites for the transesterification, which facilitates grafting more flame retardant monomers onto the cellulose, thereby improving the flame retardancy of the cellulose.

(b) A cellulose phosphite ester solution is obtained by adding dimethyl phosphite and a catalyst to the homogeneous cellulose solution obtained in step (a) for performing a transesterification.

In some embodiments, a molar ratio of dehydrated glucose units of the homogeneous cellulose solution to the dimethyl phosphite is 1:(7-9). In some embodiments, the molar ratio of dehydrated glucose units of the homogeneous cellulose solution to the dimethyl phosphite may be 1:7, 1:8, or 1:9.

In some embodiments, a reaction temperature of the transesterification is 110° C. and a reaction time of the transesterification is 3 h.

In some embodiments, the catalyst is 1,8-diazabicyclo[5.4.0]undec-7-ene, and the molar ratio of 1,8-diazabicyclo[5.4.0]undec-7-ene to the dimethyl phosphite is 1:4.

In some embodiment of the present disclosure, dehydrated glucose units of the homogeneous cellulose solution contain reducing hydroxyl groups, and the dimethyl phosphite contains ester groups. The transesterification occurs between the reducing hydroxyl groups of dehydrated glucose units and the ester groups of the dimethyl phosphite in the presence of an alkaline catalyst, thereby grafting phosphorus-containing groups, which enhance the flame retardancy of the cellulose, onto the molecular chain of the cellulose.

(c) Cellulose phosphite ester powder is obtained by regeneration solvent precipitation, washing, centrifugation, and drying of the cellulose phosphite ester solution obtained in step (b).

A regeneration solvent is a solvent used to precipitate the cellulose phosphite ester solution. In some embodiments, the regeneration solvent may be ethanol.

In some embodiments, the step (c) may include: obtaining a precipitate of cellulose phosphite ester by adding ethanol to the cellulose phosphite ester solution, a mass ratio of the ethanol to the ionic liquid cosolvent system being 2:1; and obtaining the cellulose phosphite ester powder by drying the precipitate of the cellulose phosphite ester after washing and centrifuging for 5 times.

(d) The flame retardant cellulose ester film is obtained by evaporating solvent after dissolving the cellulose phosphite ester powder obtained in step (c) in dimethyl sulfoxide.

In some embodiments, the step (d) may include: obtaining a cellulose phosphite ester-dimethyl sulfoxide solution by weighing the cellulose phosphite ester powder and adding the cellulose phosphite ester powder to the dimethyl sulfoxide for dissolving, the mass ratio of the cellulose phosphite ester powder to the dimethyl sulfoxide is 3:100; and obtaining the flame retardant cellulose ester film by drying the cellulose phosphite ester-dimethyl sulfoxide solution in a vacuum drying oven at 80° C. for 48 h.

In some embodiments, a residual carbon rate of the flame retardant cellulose ester film is within a range of 30.4-33.7%. In some embodiments, the residual carbon rate of the flame retardant cellulose ester film may be 30.4%, 31.9%, or 33.7%.

FIG. 1 is a schematic diagram illustrating a preparation method for a flame retardant cellulose ester film according to some embodiments of the present disclosure. As shown in FIG. 1, a homogeneous cellulose solution is obtained by dissolving cellulose in an ionic liquid cosolvent system of 1-butyl-3-methylimidazole chloride salt/dimethyl sulfoxide; a cellulose phosphite ester solution is obtained by using dimethyl phosphite as a flame retardant monomer and 1,8-diazabicyclo[5.4.0]undec-7-ene as a catalyst for performing a transesterification; and the flame retardant cellulose ester film is obtained by evaporating solvent in dimethyl sulfoxide.

In some embodiments of the present disclosure, the cellulose phosphite ester is prepared by first dissolving the cellulose and then modifying the cellulose. In this way, more flame retardant monomers may be grafted onto the cellulose, thereby sufficiently improving the flame retardant property of the cellulose. The use of the ionic liquid as a solvent has advantages of green environmental protection, simple operation, recyclability, and ease of industrialization. By changing the molar ratio of reactants, the degree of esterification of the cellulose phosphite ester can be regulated, i.e., the degree of flame retardancy can be controlled. The residual carbon rate of the flame retardant cellulose ester film prepared by embodiments of the present disclosure is higher, and the flame retardant cellulose ester film does not produce toxic and corrosive gases during thermal decomposition, and therefore can be used in fields such as flame retardant coatings, chemical industry, packaging films, agricultural mulch films, etc.

The present disclosure is described in detail below in connection with specific embodiments. The following embodiments will be helpful to those skilled in the art to further understand the present disclosure, but do not limit the present disclosure in any way. It should be noted that to those skilled in the art, a number of adjustments and improvements can be made without departing from the idea of the present disclosure. These all fall within the scope of protection of the present disclosure.

EXAMPLES

Example 1

A preparation method for a flame retardant cellulose ester film, including following steps.

In step (a), a cellulose dispersion was obtained by weighing 0.5 g of microcrystalline cellulose and ultrasonically dispersing 0.5 g of microcrystalline cellulose in 5 g of dimethyl sulfoxide; a homogeneous cellulose solution was obtained by adding the cellulose dispersion to 10 g of 1-butyl-3-methylimidazole chloride salt solution and reacting at 110° C. for 1 h.

In step (b), a cellulose phosphite ester solution was obtained by adding 2.55 mL of dimethyl phosphite and 1.06 mL of 1,8-diazabicyclo[5.4.0]undec-7-ene to the homogeneous cellulose solution and reacting at 110° C. for 3 h.

In step (c), a mixture of cellulose phosphite ester and ethanol was obtained by adding 30 mL of ethanol to the cellulose phosphite ester solution, the mixture was centrifuged to obtain a precipitate of the cellulose phosphite ester, and cellulose phosphite ester powder was obtained by drying the precipitate of the cellulose phosphite ester after washing and centrifuging for 5 times.

Figure 2:
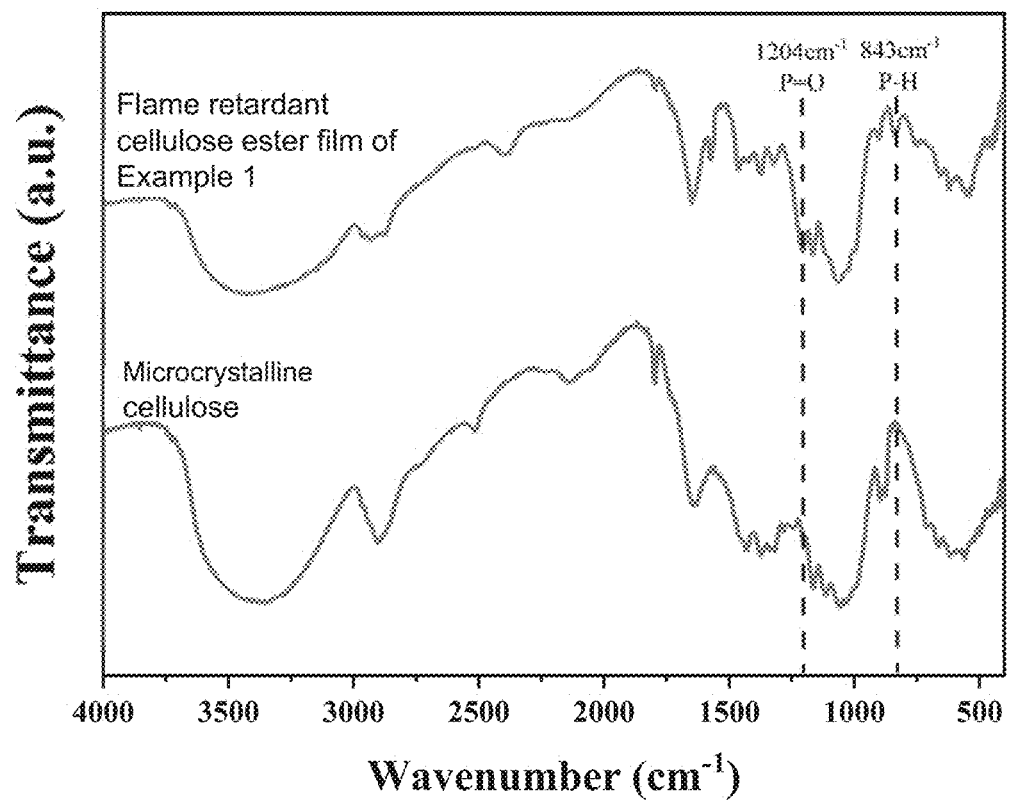
FIG. 2 is an infrared spectrogram of a microcrystalline cellulose according to some embodiments of the present disclosure and a flame retardant cellulose ester film prepared according to Example 1.

As shown in FIG. 2, the cellulose phosphite ester has a peak of P=O at 1204 $cm^{-1}$ and a peak of P—H at 843 $cm^{-1}$, which are characteristic peaks of the phosphite group.

Figure 3:
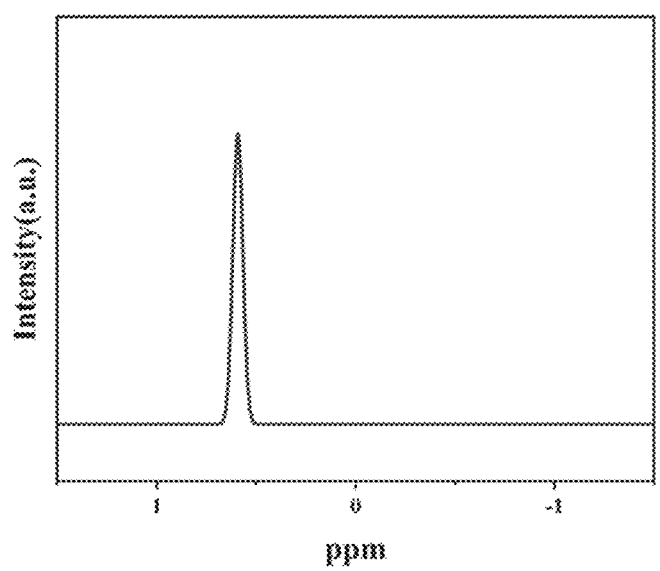
FIG. 3 is a nuclear magnetic resonance phosphorus spectrogram of a flame retardant cellulose ester film according to Example 1 of the present disclosure.

As shown in FIG. 3, a signal near 0.5 ppm is observed for the cellulose phosphite ester, indicating that the cellulose phosphite ester contains phosphite groups.

In step (d), a cellulose phosphite ester-dimethyl sulfoxide solution was obtained by weighing 0.3 g of the cellulose phosphite ester powder and adding the weighed cellulose phosphite ester powder to 10 g of dimethyl sulfoxide solution for ultrasonically dissolving at 50° C. for 30 min, and the flame retardant cellulose ester film was obtained by pouring the cellulose phosphite ester-dimethyl sulfoxide solution into a Petri dish of polytetrafluoroethylene with a diameter of 8 cm and drying in a vacuum drying oven at 80° C. for 48 h.

The flame retardant cellulose ester film prepared in Example 1 was tested to have a thickness of 30-40 μm, a residual carbon rate of 33.7%, a tensile strength of 10.6 MPa, and an elongation at break of 20.3%.

Performance Test (1) Thickness test: according to the standard GB/T 6672-2001 (plastics film and sheeting—determination of thickness by mechanical scanning), the thickness of a sample of the flame retardant cellulose ester film was determined using an electronic thickness gauge. A size of the sample of the flame retardant cellulose ester film was a circle with a diameter of 8 cm, and five points of the sample were taken for each test.

(2) Determination of a residual carbon rate: according to the standard GB/T 27761-2011 (standard test method of mass loss and residue measurement validation of thermogravimetric analyzers), the residual carbon rate of the flame retardant cellulose ester film was determined by using TGA550 thermogravimetric analyzer with a test temperature in a range of 30-600° C. and a heating rate of 10° C.·$min^{-1}$. A test gas is nitrogen with a flow rate of 30 mL·$min^{-1}$, and the greater the residual carbon rate, the better the flame retardant performance.

(3) Determination of a tensile property: according to the standard GB/T 13022-1991 (plastics—determination of tensile properties of films), the tensile property of the sample of the flame retardant cellulose ester film was determined using an EJA Vantage10 24" tensile tester. A size of a rectangular sample was 30 mm×10 mm, and a thickness of the rectangular sample was determined by the thickness test (1). The experimental procedure was carried out at 25° C. at a tensile rate of 2 mm·$min^{-1}$, and each group of samples was tested five times and an average value was calculated. The greater the tensile strength, the better the mechanical property of the film; the greater the elongation at break, the better the ductility of the film.

Example 2

A preparation method for a flame retardant cellulose ester film, including the following steps.

In step (a), a cellulose dispersion was obtained by weighing 0.5 g of microcrystalline cellulose and ultrasonically dispersing 0.5 g of microcrystalline cellulose in 5 g of dimethyl sulfoxide, and a homogeneous cellulose solution was obtained by adding the cellulose dispersion to 10 g of 1-butyl-3-methylimidazole chloride salt solution and reacting at 110° C. for 1 h.

In step (b), a cellulose phosphite ester solution was obtained by adding 2.264 mL of dimethyl phosphite and 0.94 mL of 1,8-diazabicyclo[5.4.0]undec-7-ene to the homogeneous cellulose solution and reacting at 110° C. for 2 h.

In step (c), a mixture of cellulose phosphite ester and ethanol was obtained by adding 30 mL of ethanol to the cellulose phosphite ester solution, the mixture was centrifuged to obtain a precipitate of the cellulose phosphite ester, and cellulose phosphite ester powder was obtained by drying the precipitate of the cellulose phosphite ester after washing and centrifuging for 5 times.

In step (d), a cellulose phosphite ester-dimethyl sulfoxide solution was obtained by weighing 0.3 g of the cellulose phosphite ester powder and adding the weighed cellulose phosphite ester powder to 10 g of dimethyl sulfoxide solution for ultrasonically dissolving at 50° C. for 30 min, and the flame retardant cellulose ester film was obtained by pouring the cellulose phosphite ester-dimethyl sulfoxide solution into a Petri dish of polytetrafluoroethylene with a diameter of 8 cm and drying in a vacuum drying oven at 80° C. for 48 h.

The flame retardant cellulose ester film prepared in Example 2 was tested to have a thickness of 30-40 μm, a residual carbon rate of 31.9%, a tensile strength of 10.6 MPa, and an elongation at break of 18.8%.

Example 3

A preparation method for a flame retardant cellulose ester film, including the following steps.

In step (a), a cellulose dispersion was obtained by weighing 0.5 g of microcrystalline cellulose and ultrasonically dispersing in 5 g of dimethyl sulfoxide, and a homogeneous cellulose solution was obtained by adding the cellulose dispersion to 10 g of 1-butyl-3-methylimidazole chloride salt solution and reacting at 110° C. for 1 h.

In step (b), a cellulose phosphite ester solution was obtained by adding 1.981 mL of dimethyl phosphite and 0.82 mL of 1,8-diazabicyclo[5.4.0]undec-7-ene to the homogeneous cellulose solution and reacting at 110° C. for 2 h.

In step (c), a mixture of cellulose phosphite ester and ethanol was obtained by adding 30 mL of ethanol to the cellulose phosphite ester solution, the mixture was centrifuged to obtain a precipitate of the cellulose phosphite ester, and cellulose phosphite ester powder was obtained by drying the precipitate of the cellulose phosphite ester after washing and centrifuging for 5 times.

In step (d), a cellulose phosphite ester-dimethyl sulfoxide solution was obtained by weighing 0.3 g of the cellulose phosphite ester powder and adding the weighed cellulose phosphite ester powder to 10 g of dimethyl sulfoxide solution for ultrasonically dissolving at 50° C. for 30 min, and the flame retardant cellulose ester film was obtained by pouring the cellulose phosphite ester-dimethyl sulfoxide solution into a Petri dish of polytetrafluoroethylene with a diameter of 8 cm and drying in a vacuum drying oven at 80° C. for 48 h.

The flame retardant cellulose ester film prepared in Example 3 was tested to have a thickness of 30-40 μm, a residual carbon rate of 30.4%, a tensile strength of 7.4 MPa, and an elongation at break of 18.1%.

Figure 4:
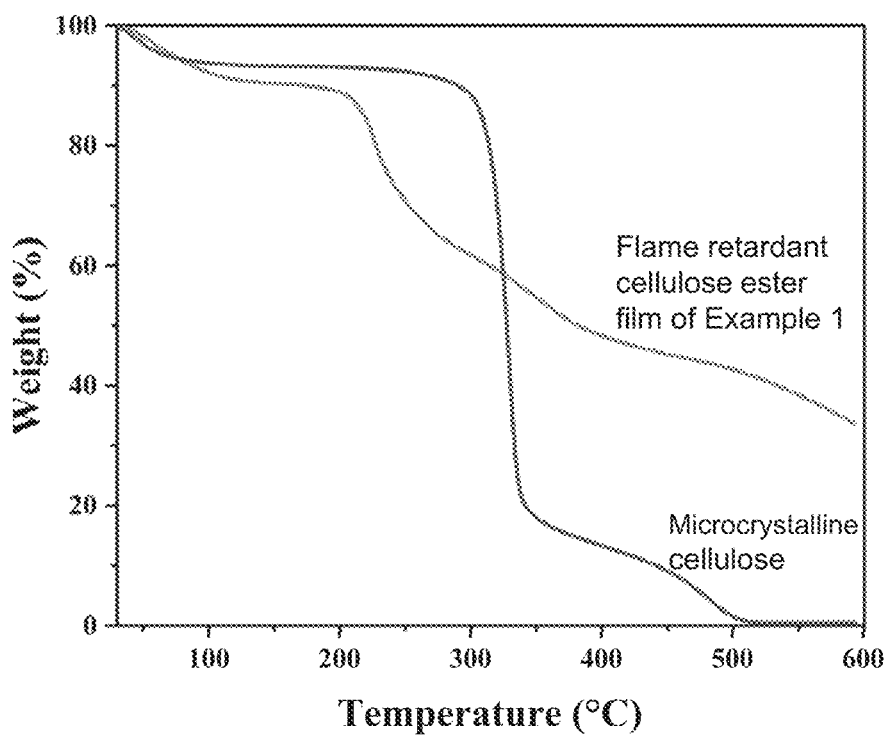
FIG. 4 is a thermogravimetric diagram of a microcrystalline cellulose according to some embodiments of the present disclosure and a flame retardant cellulose ester film prepared according to Example 1.

FIG. 4 is a thermogravimetric diagram of a microcrystalline cellulose according to some embodiments of the present disclosure and a flame retardant cellulose ester film prepared according to Example 1. As shown in FIG. 4, the microcrystalline cellulose and the flame retardant cellulose ester film prepared in Example 1 exhibit significant differences during thermal degradation. In Example 1, phosphorous-containing groups were successfully grafted onto the molecule chain of the cellulose, thereby significantly improving the residual carbon rate of the flame retardant cellulose ester film, i.e., under heating conditions, more residual carbon layers can prevent further combustion of the flame, thus making the film highly flame retardant.

Figure 5:
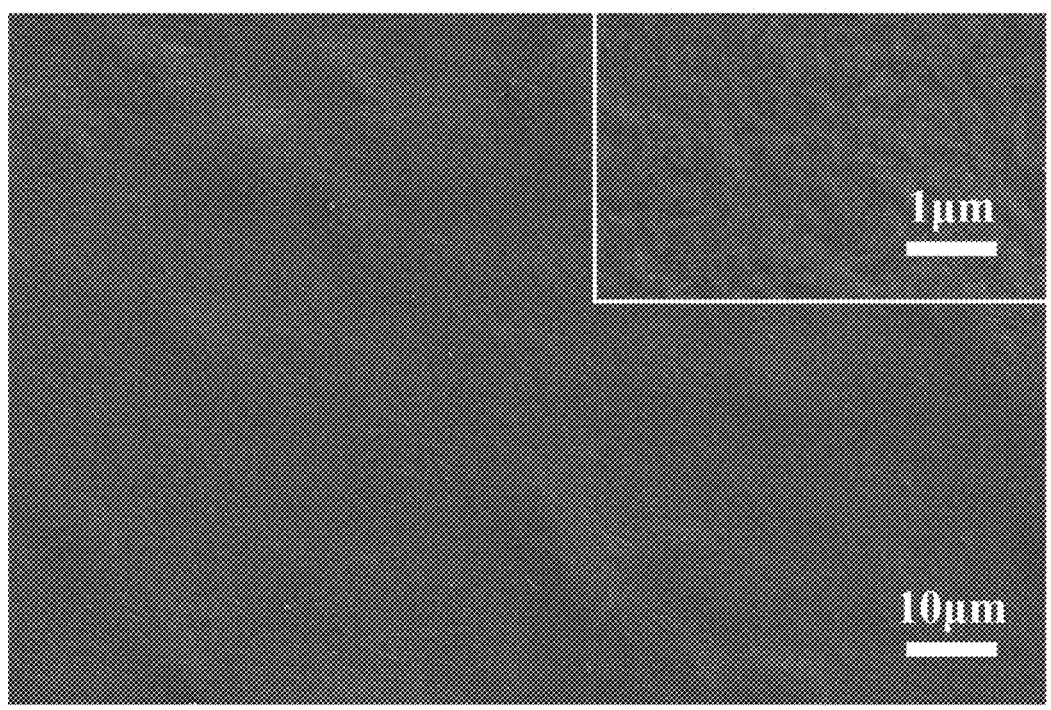
FIG. 5 is a scanning electron microscope image illustrating a surface of a flame retardant cellulose ester film according to Example 1 of the present disclosure.

FIG. 5 is a scanning electron microscope image illustrating a surface of a flame retardant cellulose ester film according to Example 1 of the present disclosure. As shown in FIG. 5, the surface of the flame retardant cellulose ester film prepared according to Example 1 is smooth and flat.

In summary, in embodiments of the present disclosure, the cellulose phosphite ester is synthesized through a transesterification in a green environmental cosolvent system of 1-butyl-3-methylimidazole chloride salt/dimethyl sulfoxide with dimethyl phosphite as the flame retardant monomer and 1,8-diazabicyclo[5.4.0]undec-7-ene as the catalyst. Then the flame retardant cellulose ester film is obtained by evaporating solvent in dimethyl sulfoxide. The process for preparing the flame retardant cellulose ester film is mild, environmentally friendly, and easy-to-operate.

The foregoing are only preferred embodiments of the present disclosure, and is not intended to limit the present disclosure. Any modifications, equivalent substitutions, and improvements made within the spirit and principles of the present disclosure shall be included in the scope of protection of the present disclosure.

What is claimed is:

1. A preparation method for a modified cellulose, wherein the modified cellulose comprises a flame retardant cellulose ester film, and the preparation method comprises:
   (a) obtaining a homogeneous cellulose solution by adding cellulose to an ionic liquid cosolvent system;
   (b) obtaining a cellulose phosphite ester solution by adding dimethyl phosphite and a catalyst to the homogeneous cellulose solution obtained in step (a) for performing a transesterification;
   (c) obtaining cellulose phosphite ester powder by regeneration solvent precipitation, washing, centrifugation, and drying of the cellulose phosphite ester solution obtained in step (b); and
   (d) obtaining the flame retardant cellulose ester film by evaporating solvent after dissolving the cellulose phosphite ester powder obtained in step (c) in dimethyl sulfoxide.

2. The preparation method of claim 1, wherein in the step (a), the ionic liquid cosolvent system is a mixture of 1-butyl-3-methylimidazole chloride salt and dimethyl sulfoxide in a mass ratio of 2:1.

3. The preparation method of claim 1, wherein in the step (a), a mass ratio of the cellulose to the ionic liquid cosolvent system is 1:30, the cellulose is a microcrystalline cellulose powder with a degree of polymerization of 280, a dissolution temperature of the cellulose in the ionic liquid cosolvent system is 110° C., and a dissolution time of the cellulose in the ionic liquid cosolvent system is 1 h.

4. The preparation method of claim 1, wherein in the step (b), a molar ratio of dehydrated glucose units of the homogeneous cellulose solution to dimethyl phosphite is 1:(7-9), and a reaction temperature of the transesterification is 110° C. and a reaction time of the transesterification is 3 h.

5. The preparation method of claim 1, wherein in the step (b), the catalyst is 1,8-diazabicyclo[5.4.0]undec-7-ene, and a molar ratio of 1,8-diazabicyclo[5.4.0]undec-7-ene to dimethyl phosphite is 1:4.

6. The preparation method of claim 1, wherein the step (c) comprises:
   obtaining a precipitate of cellulose phosphite ester by adding ethanol to the cellulose phosphite ester solution, wherein a mass ratio of the ethanol to the ionic liquid cosolvent system is 2:1; and
   obtaining the cellulose phosphite ester powder by drying the precipitate of the cellulose phosphite ester after washing and centrifuging for 5 times.

7. The preparation method of claim 1, wherein the step (d) comprises:
   obtaining a cellulose phosphite ester-dimethyl sulfoxide solution by weighing the cellulose phosphite ester powder and adding the cellulose phosphite ester powder to dimethyl sulfoxide for dissolving, wherein a mass ratio of the cellulose phosphite ester powder to dimethyl sulfoxide is 3:100; and
   obtaining the flame retardant cellulose ester film by drying the cellulose phosphite ester-dimethyl sulfoxide solution in a vacuum drying oven at 80° C. for 48 h.

8. The preparation method of claim 1, wherein a residual carbon rate of the flame retardant cellulose ester film is within a range of 30.4-33.7%.

* * * * *